United States Patent [19]
Wada et al.

[11] 4,197,578
[45] Apr. 8, 1980

[54] MICROPROGRAM CONTROLLED DATA PROCESSING SYSTEM

[75] Inventors: Kenichi Wada; Kanji Kubo, both of Hatano, Japan

[73] Assignee: Hitachi, Ltd., Japan

[21] Appl. No.: 869,003

[22] Filed: Jan. 12, 1978

[30] Foreign Application Priority Data

Jan. 14, 1977 [JP] Japan .................. 52-2397

[51] Int. Cl.$^2$ .............................................. G06F 9/16
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,404,378 | 10/1968 | Threadgold et al. | 364/200 |
| 3,800,293 | 3/1974 | Enger et al. | 364/200 |
| 3,990,054 | 11/1976 | Perlowski | 364/200 |
| 4,080,648 | 3/1978 | Asano et al. | 364/200 |
| 4,087,857 | 5/1978 | Joyce et al. | 364/200 |

*Primary Examiner*—Harvey E. Springborn
*Attorney, Agent, or Firm*—Craig and Antonelli

[57] ABSTRACT

A circuit outputs different subsidiary address data depending on operand address data contained within operand designation fields and operation codes of system instructions. A control storage, which stores microinstructions, is accessed for the initial microinstructions, contained within microinstruction sequences for system instructions, at storage locations specified by the operation codes and the subsidiary address data. As a result, different microinstruction sequences for system instructions with the same operation code can be initiated depending on the operand address data, without using any microinstructions for testing the operand address data.

12 Claims, 17 Drawing Figures

(a) RS FORMAT

| OP CODE | R₁ | R₃ | B₂ | D₂ |
|---|---|---|---|---|
| 0  7 | 8  11 | 12  15 | 16  19 | 20  31 |

(b) RX FORMAT

| OP CODE | R₁ | X₂ | B₂ | D₂ |
|---|---|---|---|---|
| 0  7 | 8  11 | 12  15 | 16  19 | 20  31 |

(c) SS FORMAT

| OP CODE | L | B₁ | D₁ | B₂ | D₂ |
|---|---|---|---|---|---|
| 0  7 | 8  15 | 16  19 | 20  31 | 32  39 | 40  47 |

| GROUP | INSTRUCTION NAME | ABBREVIATED NAME | OP CODE (HEXADECIMAL) | INSTRUCTION FORMAT |
|---|---|---|---|---|
| 1 | STORE | ST | 50 | RX |
|   | STORE (LONG) | STD | 60 |  |
| 2 | LOAD MULTIPLE | LM | 98 | RS |
|   | STORE MULTIPLE | STM | 90 |  |
| 3 | MOVE (CHARACTER) | MVC | D2 | SS |
|   | AND (CHARACTER) | NC | D4 |  |
|   | OR (CHARACTER) | OC | D6 |  |
|   | EXCLUSIVE OR (CHARACTER) | XC | D7 |  |

| INSTRUCTIONS | CONDITIONS ON OPERAND ADDRESS DATA | ADDRESS DATA | |
|---|---|---|---|
| | | M1 | M2 |
| LOAD MULTIPLE STORE MULTIPLE | $R_1 = R_3$ | 1 | 0 |
| | $R_1 + 1 = R_3$ | 0 | 1 |
| | $R_1 \neq R_3$ & $R_1 + 1 \neq R_3$ | 0 | 0 |
| STORE | BC = 0 | 1 | 0 |
| | BC = 4 | 0 | 1 |
| | BC ≠ 0 & BC ≠ 4 | 0 | 0 |
| STORE (LONG) | BC = 0 | 1 | 0 |
| | BC ≠ 0 | 0 | 0 |

| INSTRUCTIONS | CONDITIONS ON OPERAND ADDRESS DATA | ADDRESS DATA | |
|---|---|---|---|
| | | $M_1$ | $M_2$ |
| MOVE (CHARACTER) AND (CHARACTER) OR (CHARACTER) EXCLUSIVE OR (CHARACTER) | WORD OVERLAP | 0 | 0 |
| | NO WORD OVERLAP AND L+BC <8 | 0 | 1 |
| | NO WORD OVERLAP AND L+BC ≥8 AND L<8 | 1 | 0 |
| | NO WORD OVERLAP AND L+BC ≥8 AND L≥8 | 1 | 1 |

---

MICROPROGRAM CONTROLLED DATA PROCESSING SYSTEM

LIST OF PRIOR ART (37 CFR1.56(a))

The following references are cited to show the state of the art:
(1) S. G. Tucker, the IBM Sys. J. Vol. 6, No. 4, 1967, page 222-241.
(2) "IBM System/370 Principles of Operation", International Business Machines, 1970.
(3) U.S. Pat. No. 3,800,293, Enger et al, Mar. 26, 1974, 340/172.5.
(4) Japanese Laying—Open Patent, laying-open number No. 48-20451, Hakata, Mar. 14, 1973.

BACKGROUND OF THE INVENTION

The present invention relates generally to the field of high performance of a microprogram controlled data processing system, and more specifically the invention relates to a microprogram-controlled data processing system with shorter execution time for system instructions.

Many of the data processing systems, such as digital computers, developed in recent years are microprogram-controlled data processing systems, where a system instruction is executed by a sequence of elementary operations. Such elementary operation is processed under the control of a microinstruction which has been stored in a control storage. A sequence of microinstructions which execute a given system instruction make up a micro routine or microprogram.

A general discussion relating to the method of implementing a micro program control storage can be found in an article entitled "Microprogram Control For System/360" by S. G. Tucker, found in the IBM System Journal, Vol. 6, No. 4, 1967, Pages 222-241.

In most microprogram-controlled systems, microinstruction sequencing is achieved by allocating a portion of each microinstruction for indicating the address of the next microinstruction to be executed. The initial microinstruction of a microinstruction sequence is uniquely determined by the operation code of the system instruction to be executed.

It is to be noted, however, that the microinstruction sequence for each system instruction is not uniquely determined by its operation code only, because some of the microinstruction sequences have several branches to be selected after testing various system conditions. Execution of several microinstructions to test various system conditions is required before one of the branches is selected. The presence of these microinstructions for test operations prolongs the execution time required for completing the system instructions.

One approach adopted in the prior art for reducing the execution time of the system instructions is to use a control storage which comprises a plurality of control storage modules. Each microinstruction is comprised of a system control data field, a next address field and a branch control data field. The system control data field in each microinstruction is used to control the system operation. The next microinstruction address is supplied to all control storage modules, allowing them access to the same storage location. Each control storage module stores one of the possible next microinstructions at the storage location specified by the next address data of the preceding microinstruction. One of the possible next microinstructions is selected by gating means in response to the results of tests on system conditions conducted under control of the branch control data.

It is to be noted that each microinstruction can control both the system operations and test of system conditions simultaneously. Thus, no specific microinstruction is required solely for testing the system conditions. As a result the number of microinstructions as well as the excution time for completing a system instruction is reduced.

It is to be noted, however, that the prior art system is effective when at least one preceding microinstruction with system control data is present before one of the next different microinstructions is to be selected. Otherwise, the initial microinstruction and the following few microinstructions serving in some cases must be specific microinstructions only for testing system conditions. Such microinstructions for tests can not be omitted, with the result that the number of microinstructions as well as the execution time for completeting a system instruction can not be reduced.

SUMMARY OF THE INVENTION

In the light of the above identified problem within a microprogram controlled data processing system, it is a primary object of this invention to produce a microprogram-controlled data processing system with less execution time for system instructions.

It is another object of this invention to provide a microprogram controlled information handling system with a control storage of less storage capacity.

It is still another object of this invention to provide a microprogram-controlled data processing system wherein no initial microinstruction is necessary in order to test various system conditions for deciding the address of the next microinstruction to be executed.

These objects of this invention are accomplished by utilizing a circuit which outputs different subsidiary address data in response to an operation code and the operand address in the operand address designation fields and a control storage accessing means for accessing a control storge at a storage location specified by both the operation code and the subsidiary address data.

When a microinstruction sequence for a system instruction is coming to the end of the operation, the control storage is accessed for the initial microinstruction of the next system instruction at a storage location specified by both the operation code and the subsidiary address data.

Thus, different microinstruction sequences for system instructions with the same operation code are initiated depending on the operand address data, without using any microinstructions for testing the data on the operand address data.

BRIEF DESCRIPTION OF THE DRAWING

Other objects and the attendant advantages of this invention will be readily appreciated as the same become better understood by reference to the following detailed description when considered in connection with the accompanying drawings in which like reference numerals designate like elements throughout the figures thereof and wherein.

Figures 1, 2, 3:
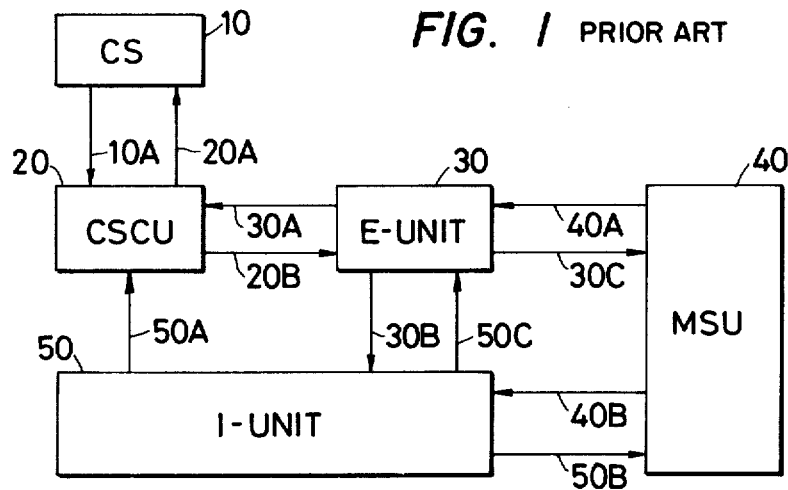
FIG. 1 is a block diagram of a microprogram-ccontrolled and pipelined data processor.
FIG. 2 is a diagram of instruction formats relevent to the present invention.
FIG. 3 is a table for system instructions used in the preferred embodiments of this invention, including instruction names, abbreviated names, operation codes and their instruction formats.

DESCRIPTION OF THE PREFERRED EMBODIMENTS 0 (1) Brief explanation of a pipelined digitial computer:

Referring now to FIG. 1, a schematic drawing of a pipelined digital computer is shown to which the present invention is applied. In the computer system as shown in FIG. 1, there are an instruction unit (I-UNIT) 50 connected to an execution unit (E-UNIT) 30, a main storage unit (MSU) 40, and a control storage control unnit (CSCU) 20. CSCU 20 is connected to a control storage (CS) 10.

Control storage 10 is a storage for microinstructions. Control storage control unit 20 sends by way of a line 20A addresses for selectively reading microinstructions from control storage 10 and control storage control unit 20 receives by way of a line 10A the read out microinstructions. Control storage control unit 20 determines the address of the next microinstruction in response to data on lines 10A, 30A, and 50A, the data on the lines 30A and 50A being supplied from executing unit 30 and, instruction unit 50, respectively. The microinstruction read out of control storae 10 is sent to execution unit 30 by way of a line 20B. Main storage 40 is for storing system instructions and operands to participate in the system operations. Main storage unit 40 sends operands to the execution unit 30 by way of a line 40A in response to signals on lines 30C and 50B, each being connected to execution unit 30 and I-UNIT 50, respectively. Main storage unit 40 further sends system instructions to instruction unit 50 by way of a line 40B in response to signals on the line 50B.

The execution unit 30 executes system instruction in response to signals on lines 20B, 50C, 40A, each being connected to control storae control unit 20, instruction unit 50 and main storage unit 40, respectively.

Instructions unit 50, which controls the execution of system instructions, determines the addresses of the system instructions to be executed in execution unit 30, sends requests to the main storage unit 40 by way of the line 50B to fetch the instructions and decodes the fetched instructions sent by way of the line 40B. Instruction unit 50 further determines the addresses of operands to participate in the system operations and sends requests to the main storage unit 40 by way of the line 50B to fetch the operands. Data sent from execution unit 30 to instruction unit 50 by way of a line 30B is used to determine the operand addresses. Instruction unit 50 sends operation codes of the system instructions to execution unit 30 by way of the line 50C. Instruction unit 50 also sends to the control storage control unit 20 by way of the line 50A address data for the initial microinstructions for the system instructions to be executed next. A computer according to the present invention can be obtained by modifying already used computers, such as the IBM System/370 computer. Modifications required for the present invention would affect the instruction unit 50 and the control storage control unit 20 for the function of sending address data to the control storage control unit 20 and for the function of addressing the control storage 10, respectively.

(2) System instructions:

Before explaining the preferred embodiments in detail, the system instructions will be explained first. The system instructions used in this invention have the same instruction formats as used in the IBM System/370 computer and explained in detail in a reference manual entitled "IBM System/370 Principles of Operation GA 22-7000-5", published by International Business Machines Corporation. Therefore, the explanation below will use the terminology used in the reference manual.

In FIG. 2 are shown three kinds of system instructions which are particularly relevant to the present invention. Explanation of other formats of system instructions will be omitted for the sake of simplicity. Every system instruction consists of two major parts: (1) a field for an operation code, which specifies the operation to be executed, and (2) an operand address designation field which represents operand address data to participate in the operation. The eight bits from 0 to 7 in any format of the system instructions listed in FIG. 2 represents an operation code (OP CODE). In the RS and RX formats, field $R_1$ or $R_3$ represents an address for a register wherein the first or the third register operand is stored. A field $B_1$ or $B_2$ in the RS, RX and SS formats is a base field which represents the address of a general purpose register (GPR), wherein data for determining the first or the second operand address is stored. A field $D_1$ or $D_2$ in the RS, RX and SS formats is a displacement field wherein data for determining the first or the second operand is designated. In the RS format the first and the third operands are register operands whose register addresses are $R_1$, $R_3$, respectively. The second operand is a storage operand, whose storage address is $D_2+GPR(B_2)$. where $D_2$ represents data in the $D_2$ field of the RS format and GPR(B$_2$) represents data stored in GPR at an address location B$_2$.

In the RX format, the first operand is a register operand whose register address is R$_1$ and the second operand is a storage operand whose storage address is GPR(X$_2$)+GPR(B$_2$)+D$_2$, wherein GPR(X$_2$) represents data stored in GPR at an address location X$_2$, X$_2$ being the data in the X$_2$ field.

In the SS format the first and the second operands are both storage operands. The storage address for the first operand is D$_1$+GPR(B$_1$) and the storage address for the second operand is D$_2$+GPR(B$_2$). Furthermore, L is a length field and the data therein specifies the number of additional operand bytes to the right of the byte designated by the first operand address. It is to be noted that data in the operand designation field may be an operand address itself or data for calculating an operand address therefrom or other data, such as that indicating the length of an operand.

Hereinafter, data contained in the operand address designation field will be referred to as operand address data throughout the specification and claims. Namely, operand address data is data included in each system instruction for specifying the address of at least one operand which is to participate in the system operation to be executed. Referring to FIG. 3, several instructions relevent to this invention are set forth in a table of instruction names, abbreviated names, OP CODEs, and instruction formats, the OP CODEs being shown in hexadecimal representation with graphic D for "13".

Figure 4:
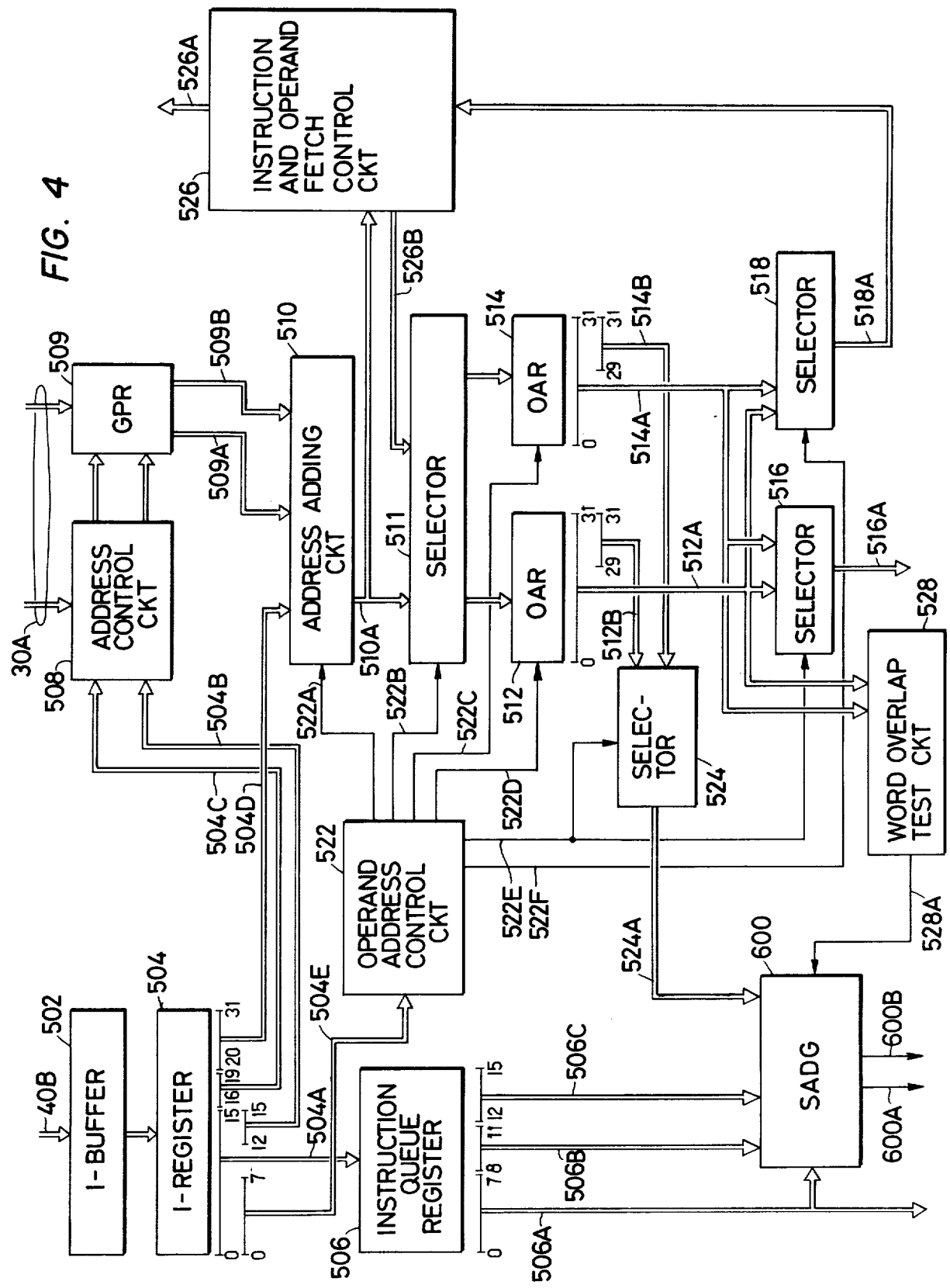
FIG. 4 is a schematic block diagram of an instruction unit in accordance with the present invention.

(3) Storage operand address generation in I-UNIT:

FIG. 4 is a block diagram illustration of the instruction unit 50 arranged in accordance with the present invention. An instruction buffer (I-buffer) 502 receives and stores a plurality of system instructions sent by way of the line 40B from main storage unit 40. One of the system instructions in the instruction buffer 502 is sent to an instruction register (I-register) 504 to be stored therein. The bits 0 to 15 of the system instruction within the I-register 504 are sent by way of a line 504A to an insruction queue register 506, which stores a plurality of instructions in its receiving order and outputs one of the stored system instructions in a first-in-first-out order. The bits from 12 to 15 and the bits from 16 to 19 of the system instruction stored in the instruction register 504 are sent to an address control circuit 508 by way of lines 504B and 504C, respectively.

The address control circuit 508 accesses a general purpose register (GPR) 509 in response to the bits on the lines 504B and 504C. The general purpose register 509 comprises a plurality of 32 bit registers. The data to be stored beforehand in register 509 is sent from the execution unit 30 by way of a part of the lines 30B and is stored in register 509 under control of the address control circuit 508 in response to store address signals sent from execution unit 30 by way of another part of the lines 30B. Two of the plurality of registers within general purpose register 509 are selectively read out under control of the address control circuit 508 in response to binary bits on the lines 504B and 504C, respectively. The data from the two selected registers is sent to lines 509A and 509B, the data on lines 509A, 509B corresponding to the bits on the line 504B and 504C, respectively. The bits 20 to 31 in the system instruction in the I-register 504 are applied via line 504D and the data on the lines 509A, 509B is sent as well to an address adding circuit 510, which generates 32 bits of addresses for storage operands to participate in the system operation for the system instruction in the I-register 504. An operand address control circuit 522 controls the address generation by the address adding circuit 510 in response to the OP CODE of the system instruction in the I-register 504. The OP CODE is sent to the operand address control circuit 522 by way of a line 504E. The signals for controlling the address adding circuit 510 are applied by way of a line 522A from the operand address control circuit 522. The operand address generated by the address adding circuit 510 is sent to either one of two operand address registers (OARs) 512, 514 by way of a line 510A and a selector 511. The selector 511 selectively connects one of two lines 510A and 526B to either one of the two register 512 and 514, under control of signals applied from the operand address control circuit 522 by way a line 522B. The signals on the line 526B will be explained later.

The operand address data supplied by the address adding circuit 510 is also sent to an instruction and operand fetch control circuit 526 by way of a line 510A to be used therein for outputting on a line 526A address data for the system instruction to be fetched. For an RX format, an address equal to D$_2$+GPR(X$_2$)+GPR(B$_2$) is generated. The data D$_2$ is supplied by the line 504D and the data GPR(X$_2$), GPR(B$_2$) is supplied by the line 509A, 509B, respectively. The operand address generated for an RX format is stored in either an empty one of the two operand address registers 512,514 by way of the selector 511. The operand address control circuit 522 has a storage to show which one of the two registers 512,514 is empty. The stored address in the selected one of the registers 512,514 is sent to main storage unit 40 by way of a line 512A or 514A, a selector 516, and a line 516A. The selector 516 is controlled by the operand address control circuit 522 by way of a line 522E so as to select one operand address register wherein address data is stored. For an RS format an address equal to GPR(B$_2$)+D$_2$ is first generated. The data D$_2$ and GPR(B$_2$) are supplied by the lines 504D and 509B, respectively. The generated address is stored in either empty one of the registers 512, 514, and is sent to main storage unit 40 as for RX formats. For RS formats, however, the stored address data is also sent to the instruction and operand fetch control circuit 526 during the execution of the instruction by way of the line 512A or 514A, a selector 518, and a line 518A.

The selector 518 is controlled by the operand address control circuit 522 by way of a line 522F so as to select one operand address register wherein address data is stored. The instruction and operand fetch control circuit 524 generates increased address data by adding 8 bits to the address data on the line 518A, and sends the increased data to either empty one of the registers 512, 514 to be stored therein, by way of the line 526B and the selector 511. The increased address is repeatedly generated and stored during the execution of the instruction, until the address D$_2$+GPR(B$_2$)+4(R$_3$−R$_1$) is generated and stored.

For an SS format, the bits from 0 to 31 of the instruction are first stored in the I-register 504.

By means of the address adding circuit 510, an address equal to D$_1$+GPR(B$_1$) is first generated. The data D$_1$ and GPR(B$_1$) bits are supplied by the lines 504D and 509B, respectively. The generated address is stored in register 512 under control of the selector 511 and the line 522D.

Before completion of the address generation by the address adding circuit 510, the remaining 16 bits, i.e., bits 32 to 47 of the same instruction, are stored in the I-register 504 at the bit locations from 16 to 31. The address adding circuit 510 generates the second address equal to $D_2+GPR(B_2)$. The data $D_2$ and $GPR(B_2)$ is supplied by the lines 504D and 509B, respectively. The generated address is stored in register 514. Thus, two storage operand addresses are stored in registers 512 and 514, each corresponding to the initial address for the first operand and the second operand, respectively. The stored data in the two registers 512, 514 are repeatedly incremented during the execution of the instruction until the addresses $D_1+GPR(B_1)+L$ and $D_2+GPR(B_2)+L$ are stored, respectively. The incrementing of the addresses in the two registers 512,514 is accomplished by the instruction and operand fetch control circuit 526 and the selectors 518, 511, as with the RS formats. The selector 516 first selects the first operand address in register 512 and then the second operand address in register 514, under control of the signals on the line 522E.

A word overlap test circuit 528 tests whether the first and the second operand addresses overlap for an SS format of instructions. The overlap test circuit 528 per se in known in the prior art and the detailed explanation of it will be omitted here. It is to be noted in relation to this invention that the output of the word overlap test circuit 528 on a line 528A can be used in a specific manner as explained later.

(4) Subsidiary Address DATA Generation:

Referring to FIG. 4 again, the present invention utilizes a subsidiary address data generator (SADG) 600. The subsidiary address data for the initial microinstruction of a microinstruction sequence to be executed for each system instruction is generated by this generator 600 on lines 600A, 600B in response to data on lines 506A, 506B, 506C, 524A, 528A. The data on the line 506A represents the OP CODE of a system instruction. The data on the lines 506B, 506C represents the bits 8 to 11 and 12 to 15 of a system instruction, respectively.

It is to be noted that for RS formats the data $R_1$ and $R_3$ is represented on the line 506B and 506C, respectively. Furthermore, for SS formats the 8 bit data L is represented by two lines 506B and 506C, the former representing the first 4 bits and the latter representing the remaining 4 bits of the 8 bits of data L, respectively. The data on the line 524A is supplied by one of operand address registers 512, 514. A selector 524 selectively connects lines 512B and 514B to the line 524A, under control of the signals on the line 522E. The lines 512B and 514B represent the bits 29 to 31 of the 32 bit operand addresses stored in registers 512 and 514, respectively. For RS, RX formats, 3 binary bits in either one of the two registers 512, 514 wherein the operand address is stored is selectively input to subsidiary address data generator 600. For SS formats, 3 bits in register 512 are selectively input to generator 600. It is to be noted that these three bits for RS, RX, SS formats indicate the address of the required operand within the 8 byte of operands which are fetched from or stored in the main storage in one cycle of a memory fetch or store operation. The signal on the line 528A is used for SS formats to show that the first and the second operand overlap. Furthermore, it is to be noted that, for instructions with RS, SS formats and store type instructions with an RS format, the operand address generated for the instruction in the I-register 504 is maintained in register 512 or 514 until the execution of the corresponding instruction has been completed. Therefore, the 16 bits supplied by the instruction queue register 506 and the data on the lines 524A, 512A, 514A corresponds to the same system instructions. Generator 600 generates different address data for the microinstruction in response to data on the lines 506A, 506B, 506C, 524A, 512A, 514A. It is to be noted that the microinstruction address generated by generator 600 depends upon the operand address data in the operand address designation field as well as on the OP CODE of the system instruction to be executed.

It must be noted, however, that although generator 600 is shown in FIG. 4 in such a manner as to be responding to all data on the lines 506B, 506C, 524A and 528A, some of them can be omitted depending on which instructions the present invention should be applied to. For example, if the present invention is applied in a manner so as to be useful to an RS format of instructions, only the data on the lines 506B, 506C as well as the OP CODE on the line 506A are sufficient. If the present invention is applied in a manner so as to be useful to an RX format of instructions, only the data on the line 524 as well as the OP CODE on the line 506A are sufficient. Furthermore, if the present invention is applied in a manner so as to be useful to an SS format of instructions, the signals on the lines 506B, 506C, 524A, 528A are all required in addition to the OP CODE on the line 506A.

It is to be noted further that the data supplied to generator 600 is that already generated in the prior art for system execution.

It is to be noted, further, that all the input data to generator 600 is data on operand addresses and the data includes (1) the operand address, such as $R_1$, $R_3$, designated explicitely in the operand designation field, (2) part of the operand address data, such as data on the lines 512A, 514A, which data is generated in I-Unit 50 in response to data on operand address in the operand address designation field which implicity represents the operand address, (3) the data L concerning the storage operand length, and (4) the data on test results on operand addresses, such as data on the line 528A.

Figure 5:
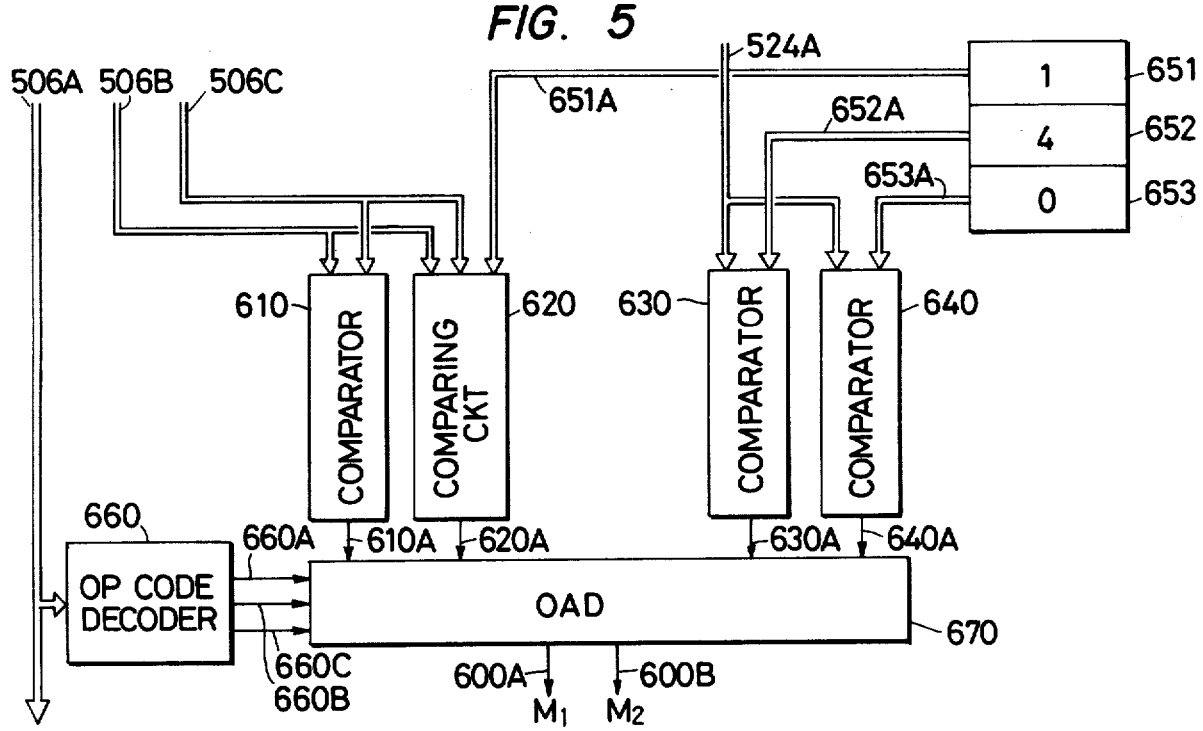
FIG. 5 is a schematic block diagram of a subsidiary address data generator (SADG) 600 in FIG. 4 according to a preferred embodiment of the present invention.

(5) Subsidiary Address data generation for RS, RX formats:

In FIG. 5 is shown a block diagram of generator 600 applicable to the four RS or RX formats of instructions in the groups 1 and 2 in FIG. 4. For RS or RX formats, the signal on the line 528A is not necessary. So in FIG. 5 no corresponding input is shown. It is to be noted that STORE instructions are executed in different microinstruction sequences, depending on the bits 29 to 31 of the second operand address. That is, three different microinstruction sequences must be executed depending on whether (1) BC=0, (2) BC=4, or (3) BC≠0 and BC≠4, where BC is the decimal representation for the above cited 3 bits.

Similarly, STORE(LONG) instructions are executed in different microinstruction sequences, depending on the bits 29 to 31 of the second operand address, that is, depending on whether (1) BC=0 or (2) BC≠0. The meaning of BC is the same as above.

It is to be noted further that the LOAD MULTIPLE or STORE MULTIPLE instruction is executed in different microinstruction sequences, depending on the relations between the first register operand address $R_1$ and the third register operand address $R_3$. That is, three different microinstruction sequences must be executed depending on whether (1) $R_1=R_3$, (2) $R_1+1=R_3$ or (3) $R_1 \neq R_3$ and $R_1+1 \neq R_3$.

A comparator 610 outputs a bit "1" on a line 610A only when the 4 bit data on the line 506B coincides with 4 bit data on the line 506C. This comparator is provided to test whether $R_1=R_3$ for STORE MULTIPLE or LOAD MULTIPLE instructions. A comparing circuit 620 outputs a bit "1" on a line 620A only when the 4 bit data on the line 506B plus the 4 bit data "0001" on a line 651A concides with the 4 bit data on the line 506C. The bit on the line 651A is given by a register 651 wherein 4 bit data "0001" is stored. This comparing circuit is to test whether $R_1+1=R_3$ for the STORE MULTIPLE or LOAD MULTIPLE instruction.

Figure 6:
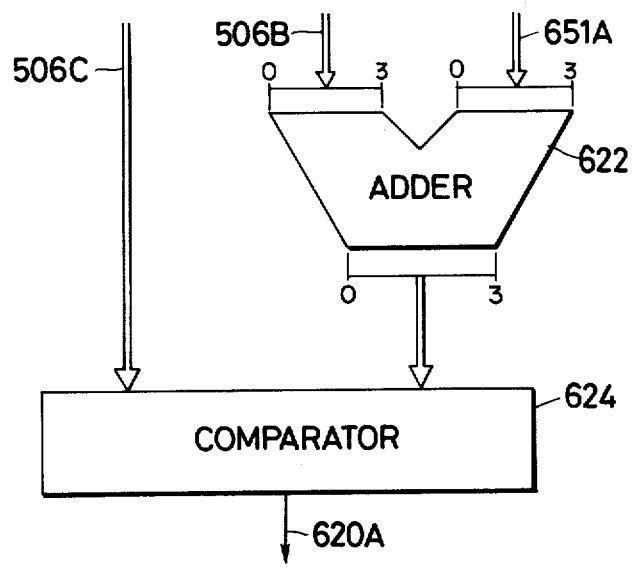
FIG. 6 is a schematic circuit diagram of the comparising circuit 620 in FIG. 5.

The comparing circuit 620 is, as shown in FIG. 6, comprised of a 4 bit adder 622 and a comparator 624. The inputs to the adder 622 are the data on the lines 506B and 651A. The output of the adder 622 is compared by the comparator 624 with the data on the line 506C. The comparator 624 outputs a bit "1" on the line 620A when the two input data coincide. Referring again to FIG. 5, a comparator 630 outputs a bit "1" on a line 630A only when the data on the line 524A coincides with the 4 bit data "0100" on the line 652A. The data on the line 652A is supplied by a register 652, wherein the 4 bit data "0100" is stored. The comparator 630 is provided to test whether BC=4 for STORE instructions. A comparator 640 outputs a bit "1" on a line 640A only when the data on the line 524A coincides with the data "0000" on a line 653A. The data on the line 653A is supplied by a register 653, wherein the 4 bit data "0000" is stored.

Figures 7, 8, 9:
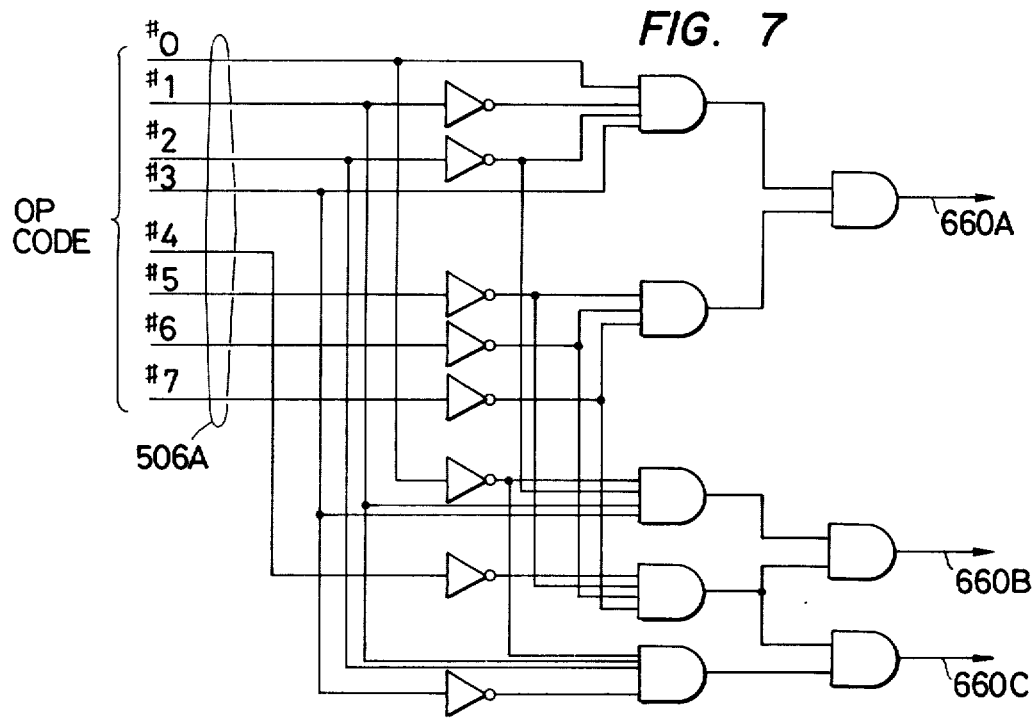
FIG. 7 is a logic circuit diagram of an OP CODE decoder 660 in FIG. 5.
FIG. 8 is a logic circuit diagram of the operand address decoder (OAD) 670 in FIG. 5.
FIG. 9 is a table which summarizes subsidiary address data $M_1$, $M_2$ provided by the circuit in FIG. 5 in relation to system instructions and conditions of operand address data.

An OP CODE decoder 660 is to output decoded signals selectively on lines 660A, 660B, 660C, in response to the OP CODE received on line 506A. The line 660A is selectively enabled only when the input OP CODE is for the LOAD MULTIPLE or STORE MULTIPLE instruction. The lines 660B, 660C are selectively enabled only when the input OP CODEs are for the STORE and STORE (LONG) instructions, respectively. The OP CODE decoder 660 is realized in a circuit shown in FIG. 7. The circuit in FIG. 7 comprises a plurality of inverters and AND gates. Each bit of the OP CODE is supplied to a respective one of a plurality of lines 506A having the corresponding bit number labelled on it. The line 660A is enabled only when the input OP CODE is "10011000" or "10010000", each corresponding the hexadecimal representations "98" and "37 90" of the LOAD MULTIPLE and STORE MULTIPLE instructions, respectively. The line 660B is enabled only when the input OP CODE is "01010000", which corresponds to the hexadecimal representation "50" of the STORE instruction. The line 660C is enabled only when the input OP CODE is "01100000" which corresponds to the hexadecimal representation of the STORE (LONG) instruction.

Referring back to FIG. 5, an operand address decoder (OAD) 670 generates two bits of subsidiary address data $M_1$, $M_2$ on lines 600A, 600B, respectively, in response to signals on the lines 610A, 620A, 630A, 640A, 660A, 660B, 660C. Decoder 670 is realized in a circuit shown in FIG. 8, which comprises a plurality of AND gates and OR gates. The address data $M_1$, $M_2$ output on the lines 600A, 600B are summarized in FIG. 9 in relation to system instructions and conditions on operand address data. When the system instruction is either a LOAD MULTIPLE instruction or a STORE MULTIPLE instruction, the line 660A is enabled by virtue of the OP CODE DECODER 660. If the first and third register operand addresses on the lines 506B, 506C satisfy the condition $R_1=R_3$, the line 610A being enabled, data "1", "0" are output on the lines 600A, 600B, respectively. If the first and the third register operand addresses on the line 506B, 506C satisfy the conditions $R_1+1=R_3$, the line 610B being enabled, data "0", "1" are output on the lines 600A, 600B, respectively. Otherwise, neither the line 610A nor 620A being enabled, the data on the lines 600A, 600B both become "0". When the system instruction is a STORE instruction, the line 660B is enabled. If the second operand address data on the line 524A satisfies the condition BC=0, the line 640A being enabled, the data "1", "0" is output on the line 600A, 600B, respectively. If the second operand address data on the line 524A satisfies the condition BC=4, the line 630A being enabled, the data "0", "1" is output on the lines 600A, 600B. Otherwise, with neither the line 630A nor the line 640A being enabled, the data on the lines 600A, 600B both becomes "0". When the system instruction is a STORE (LONG) instruction, the line 660C is enabled. If the second operand address data on the line 524A satisfies the condition BC=0, the line 640A being enabled, data "1", "0" are output on the lines 600A, 600B, respectively. Otherwise, with neither the line 630A nor the line 640A being enabled, the data on the lines 600A, 600B both become "0". Thus different subsidiary address data $M_1$, $M_2$ are output on the lines 600A, 600B, in response to conditions of the operand address data. These data $M_1$, $M_2$ can be used as part of the address of the initial microinstruction of the microinstruction sequences for the LOAD MULTIPLE, STORE MULTIPLE, STORE (LONG) instruction.

Figure 10:
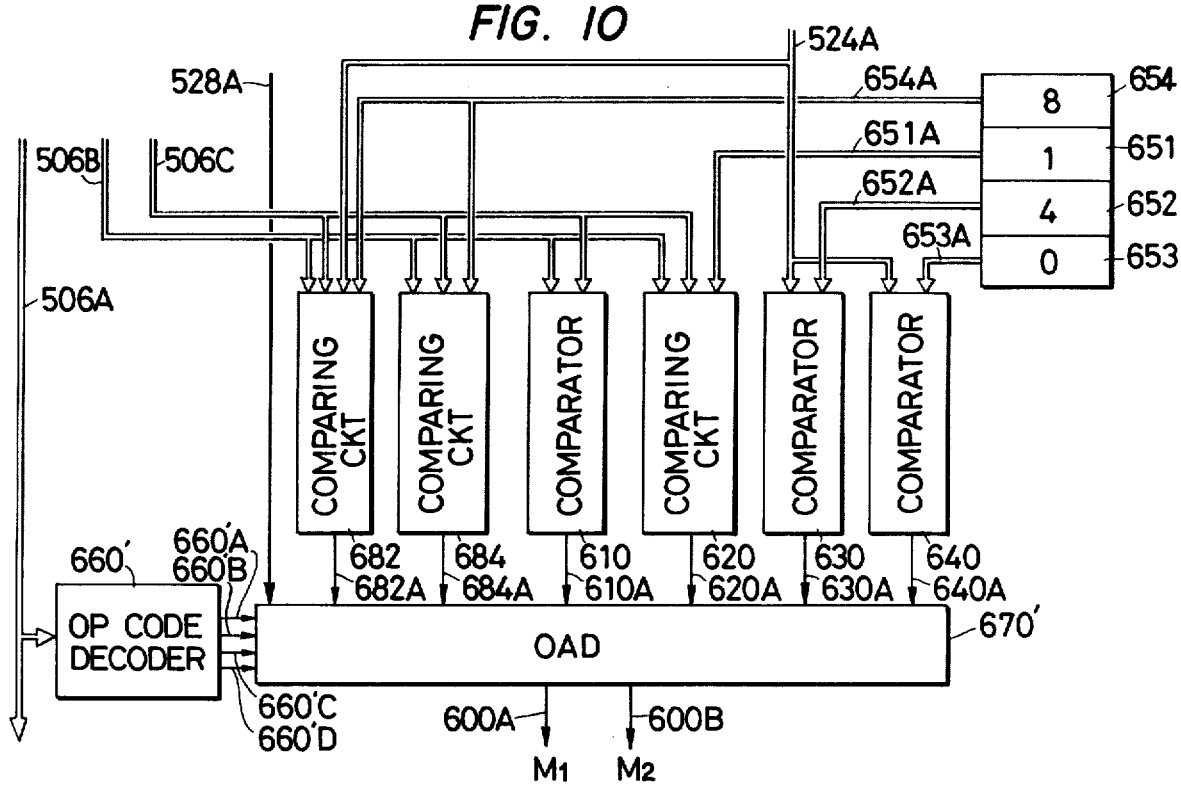
FIG. 10 is another schematic block diagram of SADG 600 in FIG. 4 according to another preferred embodiment of the present invention.

(6) Subsidiary Address data generation for RS, RX, SS formats:

In FIG. 10 is shown a modified block diagram of subsidiary address data generator 600, which is applicable to all 3 groups of instructions in FIG. 4. The embodiment of FIG. 10 differs from that of FIG. 5 in that (1) an OP CODE DECODER is responsive to all instructions in FIG. 4, (2) two comparing circuits 682, 684 are added, (3) the output of the overlap test circuit 528 is used to generate subsidiary address data $M_1$, $M_2$, and (4) a register 654 is added. It must be noted that the comparing circuit 620 as well as the comparators 610, 620, 640 and the registers 651, 652, 653 are the same as that in FIG. 5. These circuits are used to test the instructions in the groups 1 and 2 in FIG. 4. The two added comparing circuits 682, 684 are used to test operand address data for SS formats. It must be noted that 4 different microinstruction sequences are required for SS formats in FIG. 4 depending on whether (1) the first and the second operands overlap, (2) the first and the second operands do not overlap and $L+BC<8$, (3) the first and the second operands do not overlap, $L<8$, and $L+BC \geq 8$, or (4) the first and the second operands do not overlap, $L \geq 8$ and $L+BC \geq 8$, where L is the decimal representation of the data in the length field L and BC is the same as explained before.

The signal on the line 528A is "1" when the first and the second operand overlap. It is to be noted here that the bits 29 to 31 of the second operand address in operand address register 514 do not influence the microinstruction sequences if a prior art circuit is included as described in U.S. Pat. No. 3,858,183 issued Dec. 31, 1974, entitled "Data Processing System and Method therefor" by Gene M. Amdahl et al, assigned to Amdahl corporation. In the above cited patent, there is shown a high speed buffer storage comprising a primary storage unit, a secondary storage unit, and means for alignment of read out data. By using this high speed buffer storage, it is possible to read out data aligned in a given position.

Figure 11:
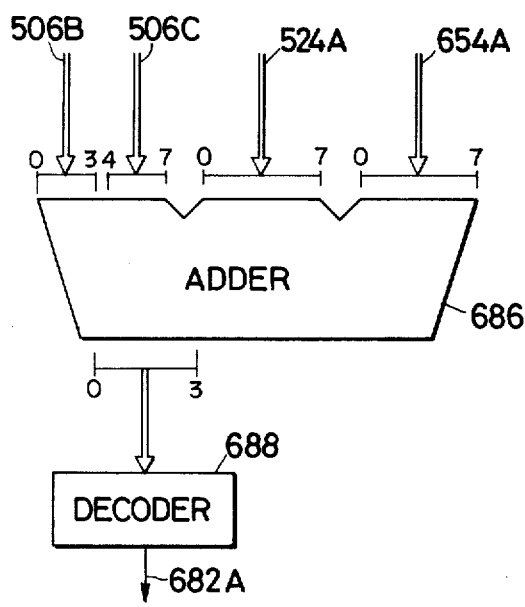
FIG. 11 is a schematic circuit diagram of a comparising circuit 682 in FIG. 10.

The comparing circuit 682 is to test whether $L+BC<8$, and applies data "1" on a line 682A only when $L+BC<8$ for SS formats. The comparing circuit 682, as shown in FIG. 11, is comprised of an adder 686 with three 8 bit data inputs and a decoder 688. On the line 654A, 8 bit data "00001000" is represented, which data is supplied by the register 654. The data on the lines 506B, 506C represent the 0 to 3 bit locations and the 4 to 7 bit locations of one of the three inputs. The output of the adder 686 can be expressed as $L+BC+8$ in decimal representation. The 0 to 3 bits of the output data of the adder 686 are input to the decoder 688, which outputs "1" on the line 682A only when all four input bits are "0". It is to be noted that the four bits must be all "0" if $L+BC<8$, and therefore the data "1" is output on the line 682A, only when $L+BC<8$.

Figure 12:
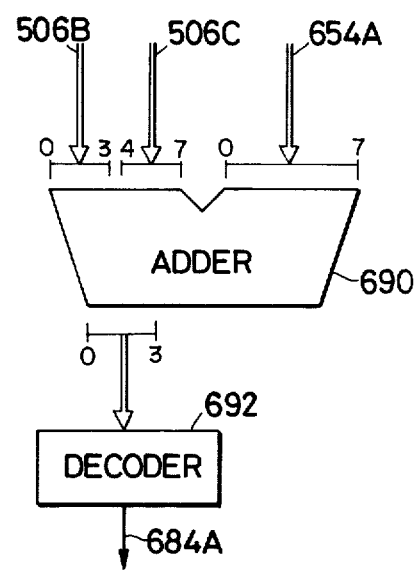
FIG. 12 is a schematic circuit diagram of a comparing circuit 684 in FIG. 10.

The comparing circuit 684 is provided to test whether $L<8$ and outputs "1" on a line 684A only when $L<8$ for SS formats. The comparing circuit is, as shown in FIG. 12, comprised of an adder 690 with two 8 bit data inputs and a decoder 692. The 4 bits of data on the lines 506B, 506C are derived from the 0 to 3 bit locations and from the 4 to 7 bit locations of one of the two inputs. To the other input data "00001000" is supplied by way of the line 654A. The output of the adder 690 can be expressed as $L+8$ in decimal representation. The 0 to 3 bits of the output data of the adder 690 are input to the decoder 692, which outputs "1" on the line 684A only when all four input bits are "0". It is to be noted that the four input bits must be all "0" if $L<8$, and therefore the data "1" is output only when $L<BC$.

Figure 13:
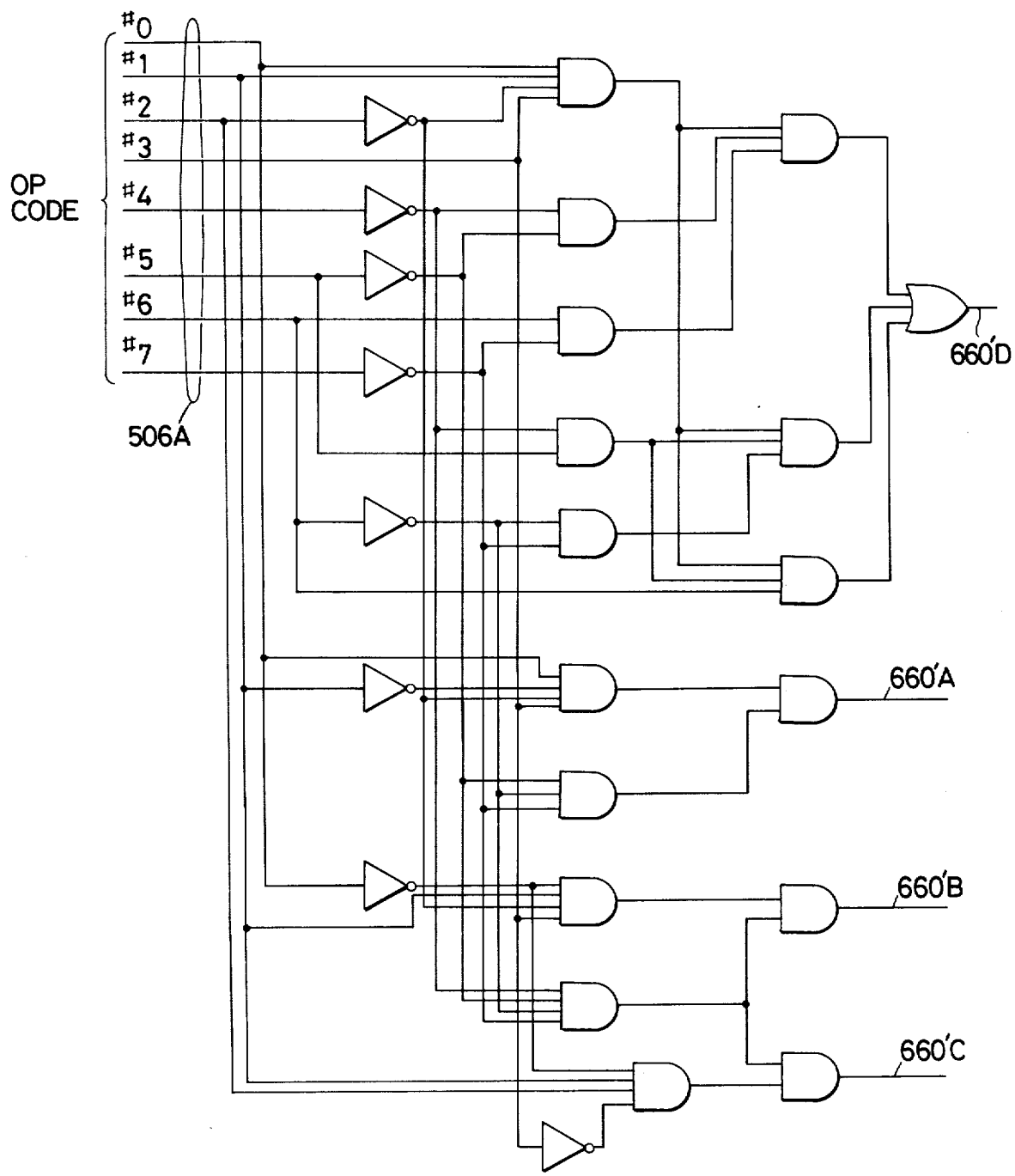
FIG. 13 is a logic circuit diagram of an OP CODE decoder 600' in FIG. 10.
Figures 14, 15:
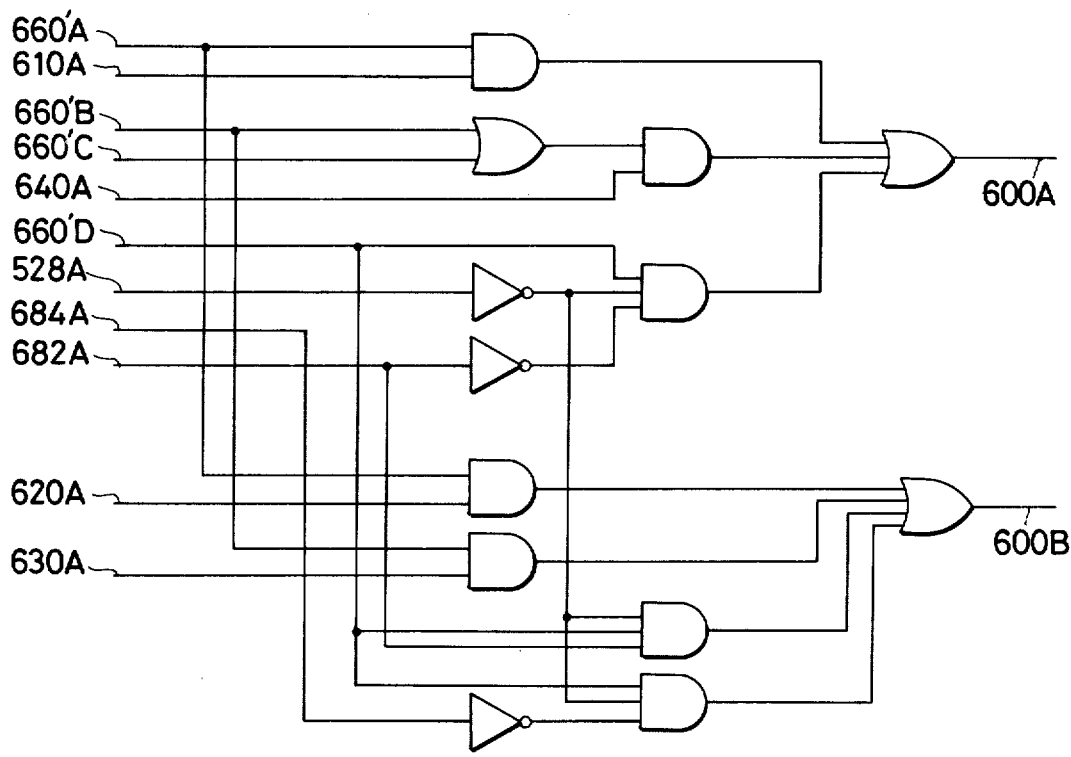
FIG. 14 is a logic circuit diagram of OAD 670' in FIG. 10.
FIG. 15 is a table which summarizes subsidiary address data $M_1$, $M_2$ provided by the circuit in FIG. 10 in relation to system instructions and conditions of operand address data.

An OP CODE decoder 660' in FIG. 10 can be realized in a circuit as seen in FIG. 13, which is comprised of an OR gate and, a plurality of AND gates and inverters. The OP CODE decoder 660' outputs decoded signals selectively on one of the lines 660'A, 660'B, 660'C, 606'D in response to the OP CODE input by way of the line 506A. The lines 660'A, 660'B, 660'C are selectively enabled only when the input OP CODE is for the LOAD MULTIPLE or STORE MULTIPLE, STORE and STORE (LONG) instructions, respectively. The situation is the same as for the lines 660A, 660B, 660C in FIG. 7. The line 660'D is enabled only when the input OP CODE is for instructions in the group 3 of FIG. 4. The OP CODEs for the MOVE (CHARACTER), AND (CHARACTER), OR (CHARACTER), and EXCLUSIVE OR (CHARACTER) instructions are "10110010", "10110100", "10110110" and "10110111", respectively each corresponding to $D_2$, $D_4$, $D_6$, $D_7$ in hexadecimal representation. Operand address decoder 670' in FIG. 10 outputs two bits of subsidiary address data $M_1$, $M_2$ on the line 600A, 600B, in response to the signals on the lines 660'A, 660'B, 660'C, 660'D, 528A, 682A, 684A, 610A, 620A, 630A, 640A. Decoder 670' can be realized in a circuit in FIG. 14 which comprises a plurality of AND gates, OR gates, and invertors. The address data $M_1$, $M_2$ output on the lines 600A, 600B for RS, RX formats are the same as in FIG. 9. For SS formats, the address data $M_1$, $M_2$ are summarized in FIG. 15 in relation to conditions on operand address data.

Figure 16:
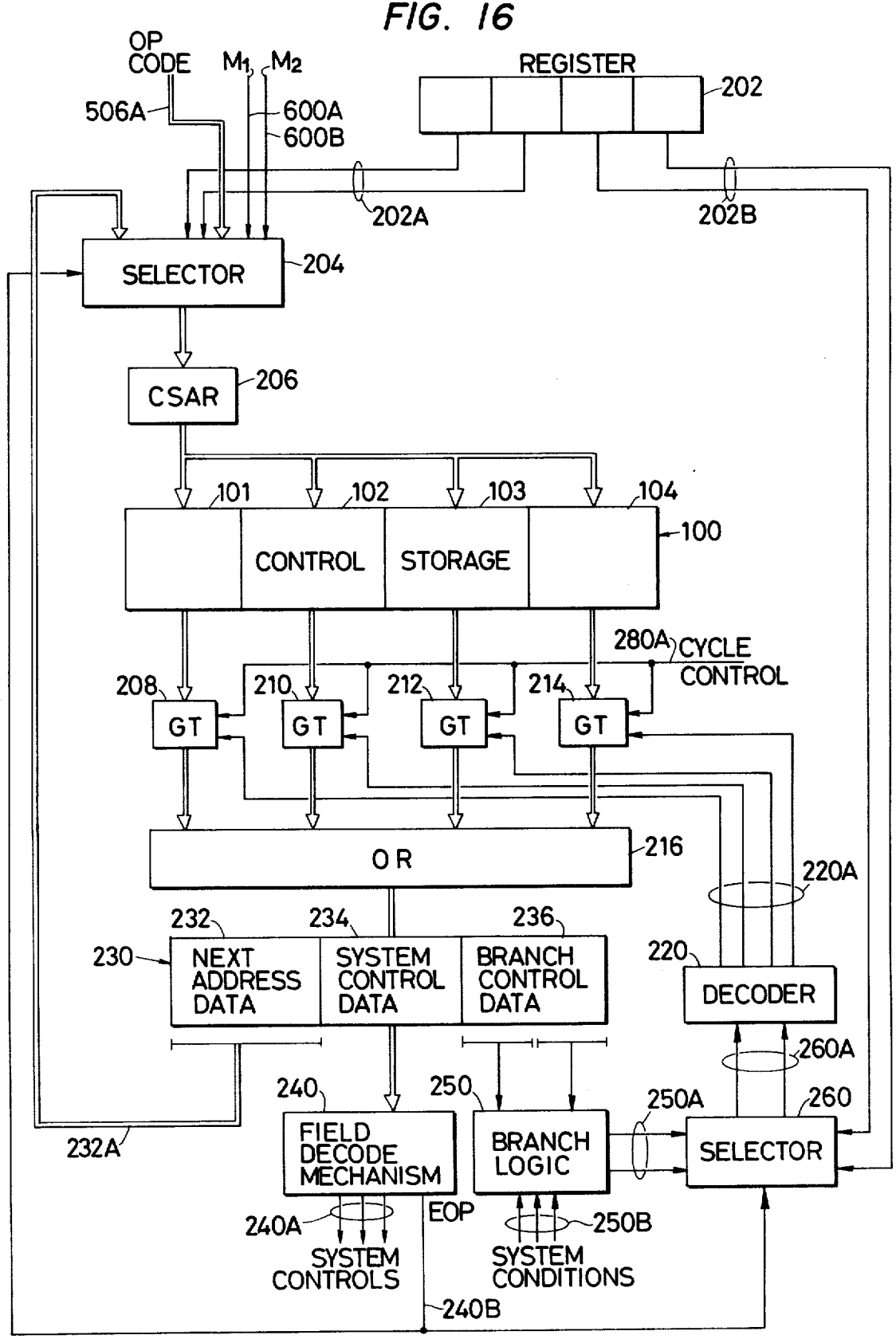
FIG. 16 is a schematic circuit diagram of a circuit for accessing control storages in accordance with the present invention.

(7) Accessing to microinstructions in the control storages:

Referring now to FIG. 16, the control storage 100 is comprised of a plurality of control modules 101, 102, 103, 104, each being simultaneously responding to the address data supplied by a common control stage address register (CSAR) 206.

The microinstruction addresses are given either by line 232A or by a group of lines 202A, 506A, 600A, 600B. The line 232A is connected to a next address data field 232 of a control register 230. The next address data in the control register 230 is used to determine when to access the next microinstruction within microinstruction sequences except the initial microinstruction of the sequences. The data on the group of lines 202A, 506A, 600A, 600B cooperatively represents the initial microinstructions of the various microinstruction sequences for system instructions. In the present embodiment, it is assumed that a microinstruction address comprises 12 bits of data. On the lines 202A, the bits from 0 to 1 of the initial address data are represented and the data, being constant, are supplied from the 1st and 2nd storage location of a register 202. On the line 506A, bits 2 to 9 of the initial microinstruction address are represented. The data, being equal to the OP CODE, is supplied from the instruction queue register 506 (FIG. 2). On the lines 600A, 600B bits 10 to 11 of the initial microinstruction address are represented. The data, being equal to the data $M_1$, $M_2$, respectively is supplied by generator 600 (FIG. 4). Generator 600 can be realized either in accordance with the embodiment in FIG. 5 or in FIG. 10. Thus, on this group of lines 12 bits of the initial microinstruction address are represented. The address data on this group of lines is selected by a selector 204 in response to a signal EOP on a line 240B, indicating when to access the initial microinstruction. When it is time to access microinstructions following the initial microinstruction, the next address data on the line 232A is selected by the selector 204. One of a plurality of microinstructions read out of the four storage modules is selectively stored in the control register 230 by way of gates 208, 210, 212, 214 and an OR gate 216. One of the four gates is enabled by a cycle control signal on a line 280A and signals provided on lines 220A by a decoder 220. The input to the decoder 220 is selected by a selector 260, which responds to data on lines 202B indicating when to access the initial microinstruction under control of the signal EOP on the line 240B. The data on the lines 202B, being constant data, is supplied from the 3rd and 4th storage locations of the register 202. As a result, to determine when to access the initial microinstruction, a predetermined one of the four gates is enabled corresponding to the constant data on the lines 202B.

A microinstruction stored in the control register 230 consists of (1) a next address data field 232, (2) a system control data field 234, and (3) a branch control data field 236. The system control data is supplied to a field decode mechanism 240, whereby various system control signals are supplied on the lines 240A. If the microinstruction in the control register 230 corresponds to the last of the microinstruction sequences for the system instruction, the signal EOP is provided on the line 240B by virtue of the field decode mechanism 240.

The signal EOP is supplied to the selectors 204, 260 to indicate that the initial microinstructions of the microinstruction sequences for the system instructions are to be accessed. The branch control data is supplied to a branch logic 250, wherein various system conditions on lines 250B are tested in response to the branch control data. The branch logic 250 outputs branch address data on lines 250A depending on the results of the test. To determine when to execute microinstructions following the initial microinstruction, the branch address on the lines 250A is selected by the selector 260, selectively enabling the corresponding one of the four gates by way of the decoder 220. It is possible that for system instructions with the same OP CODE, different initial microinstructions can be accessed, depending on the subsidiary address data $M_1$, $M_2$ which are determined by the operand address data. It is to be noted further that no microinstructions are used for testing the operand address data.

It is also to be noted that the possible initial microinstructions are stored in one of the storage modules, with the result that the number of possible initial microinstructions may be more than the number of the storage modules. Other non-selected three microinstructions read out simultaneously with the selected one are not provided as initial microinstructions but can be used as microinstructions following the initial microinstruction.

Figure 17:
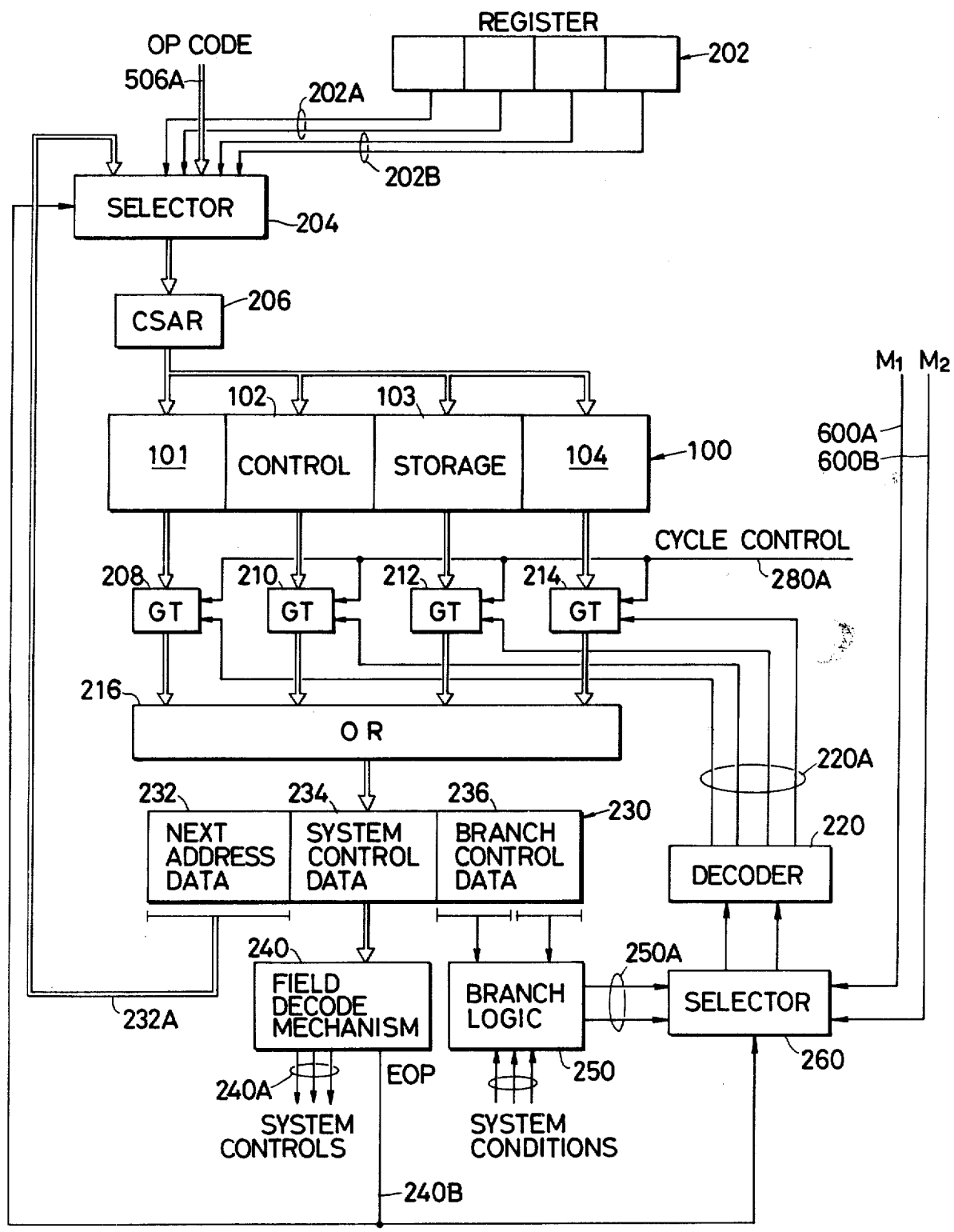
FIG. 17 is another schematic circuit diagram of a circuit for accessing control storages in accordance with the present invention.

(8) Different Accessing to Microinstructions in the Control Storage:

Referring now to FIG. 17, another embodiment of the control storage access circuit of the present invention is illustrated. The embodiment in FIG. 17 differs from that of FIG. 16 in that the subsidiary address data $M_1$, $M_2$ is supplied to the selector 260 instead of the selector 204 and that the constant two bits of data on the lines 202B are supplied to the selector 204 instead of the selector 220. The two bits of data on the lines 202B are used as bits 10 and 11 of the initial microinstruction address. The subsidiary address data $M_1$, $M_2$ is used to select the corresponding one of the four gates when the initial microinstruction should be accessed.

It is to be noted that for system instructions with the same OP CODE, the initial microinstruction address supplied to each storage module is independent of the subsidiary address data $M_1$, $M_2$, and therefore independent of the operand address data. Therefore, each one of the different initial microinstructions for instructions with the same OP CODE must be stored in each storage module. The particular one initial microinstruction among these initial microinstructions is selected by the gates 208, 210, 212, 214 in response to the subsidiary address data $M_1$, $M_2$ on the lines 600A, 600B. Thus, different initial microinstructions in the different storage modules are selectively stored in the control register 230, depending on the operand address and without using any microinstructions for testing the operand address data.

It is to be noted that the embodiment in FIG. 17 is superior to that in FIG. 16 because according to the former, the initial microinstruction is set in the control register 230 faster than provided in the latter embodiment. According to the latter, the initial microinstruction address is determined with a delay time equal to the delay times of the gates within generator 600, after an instruction is output on the lines 506A, 506B, 506C. Meanwhile, according to the former, no delay time is produced due to such gates because the initial microinstruction address stored in common control stage address register 206 does not depend on the subsidiary address data $M_1$, $M_2$. According to the former, the subsidiary address data $M_1$, $M_2$ are used to enable one of the gates selectively. The delay time for producing the data $M_1$, $M_2$ does not result in delay of the selection of the microinstructions from each module, but results from the fact that the storage modules output microinstructions to the gates with a delay time equal to the access time of the modules after the initial microinstruction has been set in register 206. The delay time within generator 600 is usually less than the access time and does not have any substantial influence upon the selection of the microinstructions which are read out.

(9) Summary:

It can be seen that this invention provides a microprogram controlled information handling system which can access the different microinstruction sequences and can be initiated depending on the operand address data as well as on the OP CODE of the instructions without using any microinstructions for testing the operand address data. Obviously, many modifications and variations of the present invention are possible in the light of the above teaching. It is, therefore, to be understood that within the scope of the appended claims the invention may be practiced otherwise than as specifically described. For example, the control storage can be comprised of a single storage module without gates for selection of the modules.

What is claimed is:

1. A data processing system wherein system operations are controlled by microinstructions in response to designated ones of system instructions each of which includes at least an operation code for designating a system operation to be executed and operand address data for specifying at least one operand which participates in the system operation to be executed, comprising:

control storage means for storing the microinstructions for use in microinstruction sequences for executing each of the system instructions, said microinstructions including different initial microinstructions for use in different microinstruction sequences for system instructions having the same operation codes but containing different operand address data;

control register means, connected to said control storage means, for receiving microinstructions from said control storage means;

subsidiary address data generator means for generating different subsidiary address data in response to each of the combinations of said operation codes and said operand address data for the designated system instructions, said subsidiary address data enabling access to one of the different initial microinstructions for use in the different microinstruction sequences for each of the designated system instructions in combination with the operation code of each of the designated system instructions;

indicating means for indicating that the initial microinstructions of the microinstruction sequences for the designated system instruction are to be accessed; and accessing means, connected to said subsidiary address data generator means and responsive to said indication by said indicating means, for accessing initial microinstructions from said control storage means at storage locations specified by each of the combinations of said operation codes and said subsidiary address data for respective designated system instructions, thereby accessing one of the different initial microinstructions for use in different microinstruction sequences for each of the designated system instructions.

2. A data processing system according to claim 1, wherein said indicating means comprises end-of-operation signal means, connected and responsive to microinstructions stored in said control register means, for generating an end-of-operation signal to indicate that the last microinstructions of the microinstruction sequences for the designated system instructions are stored in said control register means.

3. A data processing system according to claim 1, wherein said subsidiary address data generator means comprises testing means for outputting different subsidiary address data in response to each of the combinations of said operation codes and said operand address data for the respective designated system instructions and dependent upon whether said operation codes and said operand address data for the respective designated system instructions satisfy at least one predetermined condition.

4. A data processing system according to claim 3, wherein said testing means comprises:
 a plurality of test circuits, each of which provides different data in response to said operand address data for the designated system instructions and dependent upon whether said operand address data for each of the designated system instructions satisfies a first respectively predetermined condition; and
 decoding means, connected to each of said plurality of test circuits, for generating different subsidiary address data in response to said operation codes for the designated system instructions and in response to each of said data provided by each of said plurality of test circuits.

5. A data processing system according to claim 4, wherein said decoding means comprises:
 first decoding means for generating decoded signals in response to said operation codes, and
 second decoding means, connected to each of said plurality of test circuits and to said first decoding means, for generating different subsidiary address data in response to said decoded signals and each of said data provided by said plurality of test circuits.

6. A data processing system according to claim 4, wherein:
 said data processing system further comprises operand address generating means for generating at least one operand address for accessing operands from said operand storage means in response to said operand address data for each of the designated system instructions, and
 said plurality of test circuits comprises:
  at least one first test circuit for generating different data in response to said operand address data and dependent upon whether said operand address data for each of the designated system instructions satisfies said first predetermined condition; and
  at least one second test circuit, connected to said operand address generating means, for generating different data in response to the operand address generated by said operand address generating means and dependent upon whether the operand address generated by said operand address generating means satisfies a second predetermined condition.

7. A data processing system according to claim 1, wherein:
 said data processing system further comprises operand address generating means for generating at least one operand address for accessing operands from said operand storage means in response to said operand address data for each of the designated system instructions; and
 said subsidiary address data generator means outputs said subsidiary address in response to each of the combinations of said operand addresses generated by said operand address generating means and said operation codes of the designated system instructions.

8. A data processing system according to claim 1, wherein:
 said control storage means comprises a plurality of control storage modules;
 said accessing means comprises a plurality of gating means, each connecting each one of said control storage modules to said control register means, and
 gate enabling means, connected to said indicating means, for selectively enabling a predetermined one of said gating means when said indication is provided by said indicating means; and
 said accessing means accesses all of said plurality of control storage modules at storage locations within each of said plurality of control storage modules specified by each of the combinations of said operation codes and said operand address data for the designated system instructions.

9. A data processing system according to claim 8, wherein said indicating means comprises means, responsive to microinstructions stored in said control register means, for generating an end-of-operation signal to indicate that the last microinstruction of a microinstruction sequence for a system instruction is stored in said control register means.

10. A data processing system according to claim 1, wherein:
 said control storage means comprises a plurality of control storage modules; and
 said accessing means comprises
  a plurality of gating means, each connecting each one of said control storage modules to said control register means, and
  gate enabling means, connected to said indicating means, for selectively enabling one of said plurality of gating means in response to combinations of said operation codes and said operand address data for the designated system instructions, when said indication is provided by said indicating means.

11. A data processing system according to claim 10, wherein said indicating means comprises means, responsive to microinstructions stored in said control register means, for generating an end-of-operation signal to indicate that the last microinstruction of a microinstruction sequence for a system instruction is stored in said control register means.

12. A data processing system, wherein system operations are controlled by microinstructions in response to designated ones of system instructions each of which includes at least an operation code for designating a system operation to be executed and operand address data for specifying at least one operand which participates in the system operation to be executed, comprising:
 control storage means for storing the microinstructions for use in microinstruction sequences for executing each of the system instructions, said control storage means storing different initial microinstructions for use in different microinstruction sequences for system instructions having the same operation codes but containing different operand address data;

indicating means for indicating that the initial microinstructions of the microinstruction sequence for designated system instructions are to be accessed; and accessing means, connected to said indication means and said control storage means and responsive to said indication by said indicating means, for accessing the initial microinstructions from said control storage means at storage locations specified by each of combinations of said operation codes and said operand address data for respective designated system instructions, thereby accessing one of the different initial microinstructions for use in different microinstruction sequences for each of the designated system instructions.

* * * * *